United States Patent [19]

Katsumori et al.

[11] 4,272,064
[45] Jun. 9, 1981

[54] GAS SPRING

[75] Inventors: Teiji Katsumori; Kunio Ishida, both of Yokohama, Japan

[73] Assignee: Tokico Ltd., Kanagawa, Japan

[21] Appl. No.: 63,341

[22] Filed: Aug. 2, 1979

[30] Foreign Application Priority Data

Aug. 18, 1978 [JP] Japan .......................... 53-100773

[51] Int. Cl.³ ............................................. F16F 9/43
[52] U.S. Cl. ................................... 267/64 R; 188/322
[58] Field of Search ...................... 188/322, 269, 321; 267/124, 118, 64, 65

[56] References Cited

U.S. PATENT DOCUMENTS 4,044,866  8/1977  Ishida ................................. 188/322

FOREIGN PATENT DOCUMENTS 2331852  1/1975  Fed. Rep. of Germany ........... 188/269

Primary Examiner—Douglas C. Butler
Attorney, Agent, or Firm—Wenderoth, Lind & Ponack

[57] ABSTRACT

A gas spring comprises a cylindrical outer sheath having a stopper holding structure on the inner surface, a rod and piston unit slidably received in the outer sheath, a rod guide and a packing sealably fitted in the outer sheath, and a stopper freely received in the outer sheath for limiting the upward movement of the piston and having engaging structure on the outer surface to engage on the stopper holding structure to thereby hold the stopper in position in the outer sheath.

5 Claims, 6 Drawing Figures

GAS SPRING

BACKGROUND OF THE INVENTION

This invention relates to a gas spring and more particularly, to a gas spring having a stopper loosely received in the outer sheath of the spring and adapted to be held in position in the outer sheath.

There have been proposed and practically employed a variety of gas springs and in most of the prior art gas springs, a stopper having an outer diameter substantially corresponding to the inner diameter of the cylindrical outer sheath of the gas spring is held in position in the outer sheath by means of mating holding structure formed on the outer surface of the stopper and the inner surface of the outer sheath, respectively.

However, in the production of the prior art gas spring, when the stopper is press-fitted in the outer sheath, the stopper frequently tends to scratch the inner surface of the outer sheath or the stopper itself is ground off to thereby produce a great amount of chips because the stopper has an outer diameter substantially corresponding to the inner diameter of the outer sheath.

SUMMARY OF THE INVENTION

Thus, the purpose of the present invention is to provide a novel and improved gas spring which can effectively eliminate the disadvantage inherent in the prior art gas springs.

According to the present invention, such purpose is attained by the provision of a circular stopper having an outer diameter slightly smaller than the inner diameter of the cylindrical outer sheath and provided with an annular recess and an annular convex on the inner surface of the outer sheath having an inner diameter substantially equal to the bottom diameter of the annular recess in the stopper, whereby the stopper can be easily inserted into the outer sheath without producing any chips and at the same time, is positively held in position in the outer sheath by the engagement between the mating annular recess and annular convex.

The above and other objects and attendant advantages of the present invention will be more readily apparent to those skilled in the art from a reading of the following detailed description in conjunction with the accompanying drawings which show preferred embodiments of the invention for illustration purposes only, but not for limiting the scope of the same in any way.

PREFERRED EMBODIMENT OF THE INVENTION

Figure 1:
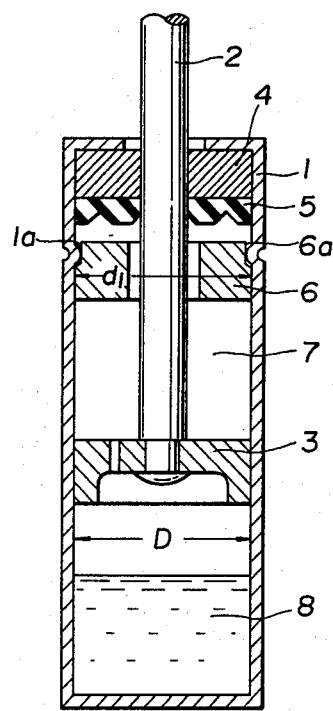
FIG. 1 is a vertically sectional view of a prior art gas spring.

For better understanding of the present invention, two types of prior art gas springs will be described referring to FIGS. 1 and 2 of the accompanying drawings. The prior art gas spring of FIG. 1 generally comprises a cylindrical outer sheath 1, a reciprocal rod 2 received within the outer sheath 1 for axially slidable movement therein, a piston 3 secured to the inner end of the rod 2 for movement in frictional contact with the inner surface of the outer sheath 1, an annular rod guide 4 press-fitted within the upper end portion of the outer sheath 1 for assisting the reciprocal movement of the rod 2, an annular packing 5 press-fitted within the outer sheath 1 underneath the rod guide 4 for gas- and oil-sealing the interior of the outer sheath 1, an annular stopper 6 press-fitted within the outer sheath 1 below the packing 5 for limiting the upward movement of the piston 3, a variable gas chamber 7 defined within the outer sheath 1 between the piston 3 and stopper 6 and a supply of oil 8 contained within the outer sheath 1 below the piston 3.

In the prior art gas spring as shown in FIG. 1, when the stopper 6 having a reduced diameter portion 6a is to be locked in position within the cylindrical outer sheath 1, the piston rod 2 is first inserted into the outer sheath 1 which is now open at one end and the stopper 6 having the outer diameter $d_1$ substantially corresponding to the inner diameter D of the outer sheath is driven from above into the outer cylinder 1 through the open end thereof to a predetermined position within the sheath while maintaining sealing relationship to the interior of the sheath. When the stopper 6 has been driven to the predetermined position within the outer sheath 1, the open end of the outer sheath 1 is partially closed by caulking the end portion defining the open upper end and the outer sheath is crimped at a selected point corresponding to the reduced diameter portion 6a of the stopper 6 to form an annular convex 1a which abuts against the reduced diameter portion 6a of the piston 6 to thereby bear a load when the piston has reached the upper limit of the reciprocal movement thereof. It is to be understood that a supply of oil 8 is introduced into the outer sheath prior to the insertion of the rod and piston unit into the outer sheath.

However, in the prior art gas spring of FIG. 1, when the stopper 6 is driven to the predetermined position within the outer sheath 1, the stopper 6 frequently tends to scratch the inner surface of the outer sheath 1 or the stopper itself is ground away because the stopper 6 is sealably press-fitted in the outer sheath 1 and as a result, chips generated as the stopper 6 scratches the outer sheath or is ground away cut into the packing 5 which causes oil and gas leakage. In order to minimize the amount of such chips to be generated, it is necessary that the stopper 6 be moved along the inner surface of the outer sheath 1 precisely in parallel with the axis of the outer sheath and this greatly impedes rapid production of the gas spring.

Figure 2:
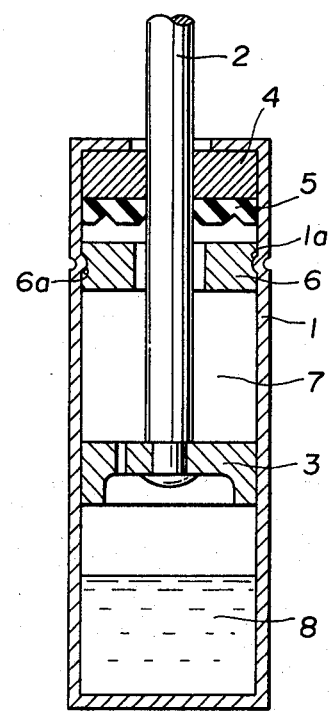
FIG. 2 is a vertically sectional view of another prior art gas spring.

The prior art gas spring as shown in FIG. 2 also has the same disadvantages as those which the prior art gas spring as shown in FIG. 1 has. Furthermore, in the prior art gas spring of FIG. 2, since the stopper 6 has an annular recess 6a in the outer surface at the midpoint between the upper and lower surfaces of the stopper 6, it is required that the stopper 6 be more precisely positioned within the outer sheath 1 and the outer sheath is then closed at the open end and crimped in the same way as mentioned in connection with the prior art of FIG. 1.

Thus, the purpose of the present invention is to eliminate the disadvantages inherent in the production of the prior art gas springs referred to hereinabove.

Figure 3:
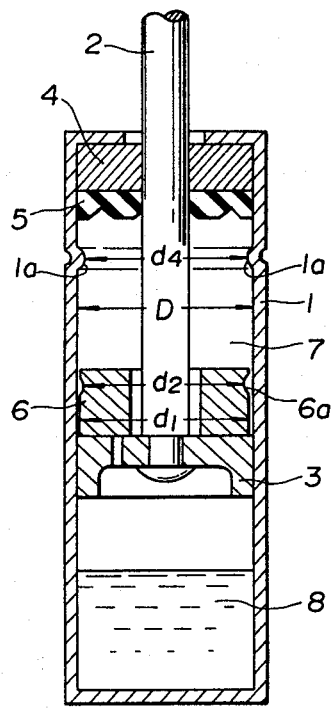
FIG. 3 is a vertically sectional view of one preferred embodiment of gas spring according to the present invention showing its various components in their positions before the stopper which is one of the components is locked in its predetermined position.
Figure 4:
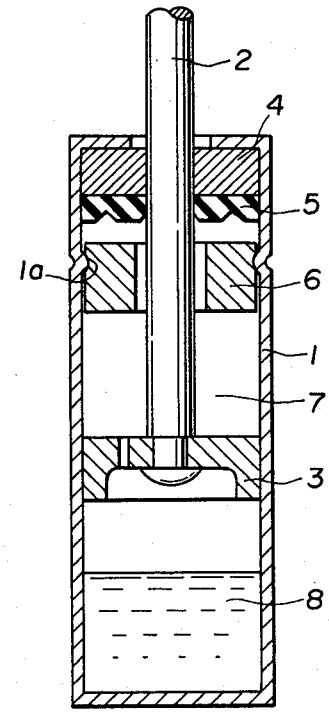
FIG. 4 is a vertically sectional view of the embodiment of gas spring of FIG. 3 showing the stopper in its locked position.

Reference will now be made to FIGS. 3 and 4 of the accompanying drawings in which one preferred embodiment of the present invention is shown. The construction and arrangement of the components of the gas spring as shown in FIG. 3 are substantially similar to those of the components of the prior art gas springs as shown in FIGS. 1 and 2 except for the facts that the annular convex 1a has been previously formed on the inner surface of the outer sheath 1 before the stopper 6 is driven to the predetermined position within the outer sheath 1 and that the stopper 6 is loosely received within the outer sheath 1.

That is, the outer sheath 1 has the substantially uniform inner diameter D. The rod 2 is received in the outer sheath 1 for reciprocal movement and has the piston 3 secured to the inner end of the rod. The piston 3 is adapted to move within the outer sheath 1 in frictional contact with the inner surface of the outer sheath. The stopper 6 rests on the upper surface of the piston 3 and is mounted on the rod 2 by means of a center hole which is greater than the diameter of the rod 2.

Although the stopper 6 for the gas spring is usually formed of aluminum or duralumin, the stopper may be formed of synthetic resin of some resiliency. The stopper 6 has the outer diameter $d_1$ and is formed in the outer surface with an annular recess 6a which is positioned adjacent to the upper surface of the stopper and has the bottom diameter $d_2$ smaller than the diameter $d_1$ of the stopper body.

In assembling the gas spring of FIG. 3, in the same manner as described in connection with the prior art gas springs of FIGS. 1 and 2, a supply of oil 8 is introduced into the outer sheath 1 through the open end thereof and the rod and piston unit 2, 3 is then inserted into the outer sheath 1 through the open end thereof to a predetermined position therein where the undersurface of the piston 3 is spacedly positioned above the head of the oil 8. Thereafter, the stopper 6 is inserted into the outer sheath 1 through the open end of the sheath until the stopper 6 rests onto the upper surface of the piston 3 and the packing 5 and rod guide 4 are then in turn press-fitted into the outer sheath 1 through the open end of the latter to a predetermined position therein. After the various components have been placed in their predetermined position within the outer sheath 1, the upper end portion of the outer sheath 1 defining the open upper end thereof is caulked to partially close the open upper end of the sheath to thereby prevent the components from inadvertently coming out of the sheath and the outer sheath is crimped at an area between the packing 5 and stopper 6 to thereby provide an annular convex 1a having the inner diameter $d_4$.

In the gas spring of FIG. 3, since the outer diameter $d_1$ of the stopper 6 is smaller than the inner diameter D of the outer sheath 1, when the stopper 6 is in the position as shown in FIG. 3 where the recess 6a in the outer surface of the stopper 6 has not yet engaged the annular convex 1a at the crimped area of the outer sheath inner surface, the stopper 6 is loosely received in the outer sheath so that the stopper can displace freely within the outer sheath 1. However, the outer diameter $d_1$ of the stopper 6 is greater than the inner diameter $d_4$ of the annular convex 1a and the bottom diameter $d_2$ of the recess 6a in the stopper outer surface is substantially equal to the inner diameter $d_4$ of the outer sheath 1 at the crimped area.

After the various components of the gas spring have been properly positioned in their predetermined positions within the outer sheath, gas is injected into from the gas chamber 7 defined within the outer sheath between the packing 5 and stopper 6 by a suitable conventional manner until a predetermined gas pressure is established within the gas spring whereupon the rod 2 is caused to move upwardly within the outer sheath 1. As the rod 2 moves upwardly, the piston 3 and stopper 6 also move upwardly together. Since the stopper 6 is loosely received within the outer sheath 1, there is no scratching or the like occuring between the stopper 6 and outer sheath 1.

After the upper edge of the stopper 6 has come into contact with the lower edge of the annular convex 1a, as the rod 2 is further raised with a stronger force, the annular convex 1a on the outer sheath 1 is caused to plastically deform radially outwardly, whereby the annular recess 6a in the stopper 6 snaps onto the annular convex 1a on the outer sheath 1 with a high force sufficient to allow the stopper 6 to bear the elongation load of the piston 3 and at the same time, to prevent the stopper 6 from falling down.

Thus, according to the present invention, the stopper 6 can be easily received into and snugly fitted in the outer sheath 1 and substantially no chips are generated from the stopper 6 or outer sheath 1. If the upper edge of the stopper 6 is rounded off, generation of chips can be more effectively eliminated.

The above-mentioned rod guide 4 is designed to support the rod 2 and assist the upward and downward reciprocal movement of the rod 2, and the packing 5 is designed to seal the gas 7 and oil 8 within the outer sheath 1.

Figure 5:
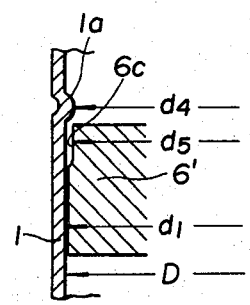
FIG. 5 is a fragmentary vertically sectional view of a modified form of the stopper shown in FIGS. 3 and 4.
Figure 6:
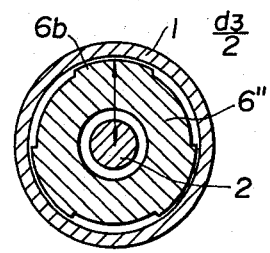
FIG. 6 is a cross-sectional view of a further modified form of the stopper shown in FIGS. 3 and 4.

FIGS. 5 and 6 show modified forms of the stopper 6 to be employed in the gas spring of the present invention. The stopper 6 of FIGS. 3 and 4 has the annular recess 6a in the outer surface between the upper and lower surfaces of the stopper, whereas the modified stopper 6' of FIG. 5 is provided in the outer surface with an annular recess 6c extending from the upper surface down to a certain distance of the thickness of the stopper and the bottom diameter $d_5$ of the recess 6c is somewhat greater than the inner diameter $d_4$ of the annular convex 1a on the outer sheath 1. When the stopper 6' having the annular recess 6c in the outer surface is to be press-fitted into the outer sheath 1, the annular convex 1a of the outer sheath is required to plastically deform radially outwardly by an amount smaller than that by which the annular convex 1a of the outer sheath in FIGS. 3 and 4 plastically deforms radially outwardly, and the force required to press-fit the stopper 6' in the outer sheath is also less than that required to press-fit the stopper 6 in the outer sheath. The difference between the diameters $d_4$ and $d_5$ is sufficient to prevent the stopper 6' from displacing inadvertently.

FIG. 6 shows a further modification of the stopper 6 of FIGS. 3 and 4. In the form of the stopper as shown in FIG. 6, the stopper 6" is provided in the outer surface at the upper or lower edge of the stopper with a plurality of convexed sectors 6b in circumferentially spaced relationship to each other in place of the annular recess 6a or 6c in FIGS. 3, 4 or FIG. 5 and the provision of the convexed sectors 6b gives the stopper 6" the outer diameter $d_3$ which is greater than the inner diameter $d_4$ of the annular convex 1a on the outer sheath 1. With the construction of the stopper 6" of FIG. 6, when the stopper 6" is to be press-fitted in the outer sheath 1, the force required to plastically deform the annular convex 1a of the outer sheath 1 radially outwardly is less than that required for plastically deforming the annular convex 1a when the stopper 6 or 6c is press-fitted in the outer sheath.

The stopper 6" of FIG. 6 is applied in the same manner as that to which the stoppers of FIGS. 3, 4 and 5 are applied. The dimensional relationship between the outer sheath 1 and the stoppers 6, 6' and 6" is selected as follows:

When it is assumed that the diameter of the stoppers 6 and 6' is $d_1$, the bottom diameters of the annular recesses 6a, 6c in the stoppers 6 and 6', respectively, are $d_2$ and $d_5$, respectively, the outer diameter of the stopper 6" at the convexed sector area (the radius at the convexed sector area is shown by $d_3/2$ in FIG. 6), the inner diameter of the outer sheath 1 is D and the inner diameter of the annular convex 1a is $d_4$, then, $$D > d > d_3 > d_4 \geqq d_2 \quad (1)$$

and $$D > d_1 > d_5 > d_4 \quad (2)$$

In the relationship (1), the present invention can be also embodied so as to have the relationship $D > d_1 > d_3 > d_2 \geqq d_4$. In this case, when the upper edge of the stopper 6' and the upper edge of the stopper 6" are bevelled, the possibility of scratching of the annular convex 1a on the outer sheath 1 by the stopper is minimized to thereby further reduce the generation of chips. And when the stopper 6 is formed of a material having more or less resiliency, the stopper 6 can be more properly press-fitted on the annular convex of the outer sheath compensating for any error in the production of the stopper.

As clear from the foregoing description in connection with the preferred embodiment, the present invention can eliminate the disadvantages such as generation of chips are reduction in production efficiency inherent in the prior art gas springs.

While only one embodiment of the invention has been shown and described in detail, it will be understood that the same is for illustration purpose only and not to be taken as a definition of the invention, reference being had for this purpose to the appended claims.

What we claim:

1. In a gas spring comprising an outer sheath having a substantially uniform inner diameter (D) and an annular convex formed on the inner surface of said outer sheath, said annular convex having an inner diameter (d4), a piston-rod unit slidably received in said outer sheath, and a stopper received in said outer sheath and having a substantially uniform outer diameter (d1), said stopper having formed in the outer surface thereof an annular recess for engaging said annular convex and for thereby holding said stopper in position within said outer sheath, said annular recess having a bottom diameter (d2), the improvement wherein:

said annular recess is formd in said outer surface of said stopper at a position intermediate upper and lower surfaces of said stopper; and said outer diameter (d1) of said stopper is greater than said bottom diameter (d2) of said annular recess and said inner diameter (d4) of said annular convex, but smaller than said inner diameter (D) of said outer sheath, whereby there is a clearance between said inner surface of said outer sheath and said outer surface of said stopper, and whereby when said annular recess of said stopper is not engaged with said annular convex of said outer sheath said stopper is freely movable within said outer sheath, such that said stopper may be easily inserted into said outer sheath without scratching said inner surface of said outer sheath or said outer surface of said stopper.

2. The improvement claimed in claim 1, wherein said bottom diameter (d2) of said annular recess is substantially equal to said inner diameter (d4) of said annular convex.

3. The improvement claimed in claim 1, wherein said outer surface of said stopper is provided with a plurality of convex sectors, the diameter (d3) of said stopper at the areas of said convex sectors being greater than said inner diameter (d4) of said annular convex, said convex sectors being press-fitted in said inner surface of said outer sheath to hold said stopper in position in said outer sheath.

4. The improvement claimed in claim 3, wherein the relationship between $d_1$, $d_2$ and $d_3$ is $d_1 > d_3 > d_2$.

5. The improvement claimed in claims 1, 2, 3 or 4, wherein said stopper is formed of a somewhat resilient synthetic resin material.

* * * * *